United States Patent
Cain, III et al.

(10) Patent No.: US 7,921,260 B2
(45) Date of Patent: Apr. 5, 2011

(54) PREFERRED WRITE-MOSTLY DATA CACHE REPLACEMENT POLICIES

(75) Inventors: Harold W. Cain, III, Hartsdale, NY (US); Jong-Deok Choi, Seongnam (KR); Mauricio J. Serrano, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 11/923,625

(22) Filed: Oct. 24, 2007

(65) Prior Publication Data
US 2009/0113132 A1    Apr. 30, 2009

(51) Int. Cl.
*G06F 12/12* (2006.01)
(52) U.S. Cl. ....................................................... 711/133
(58) Field of Classification Search .................. None
See application file for complete search history.

(56) References Cited

U.S. PATENT DOCUMENTS

| | | | |
|---|---|---|---|
| 5,526,474 A | 6/1996 | Fukushima | |
| 6,327,643 B1 | 12/2001 | Egan | |
| 6,813,691 B2 * | 11/2004 | Gaither et al. | 711/133 |
| 6,834,329 B2 | 12/2004 | Sasaki | |
| 6,895,498 B2 | 5/2005 | McDonald | |
| 2003/0110357 A1 * | 6/2003 | Nguyen et al. | 711/136 |
| 2006/0179231 A1 | 8/2006 | Briggs | |

OTHER PUBLICATIONS

Wang, Y, et al., "T1: An Efficient Cache Replacement with Distinguishing Write Blocks From Read Blocks in Disk Arrays," Parallel and Distributed Processing and Applications, IPSA 2005 International Workshops, Nanjing, China, Nov. 2-5, 2005, Proceedings.
Wang Yulin, et al., "T1: A Write-prior Partitioning LRU Algorithm for the Multi-port Cache in Disk Arrays," International Conference on Computer and Information Technology, 5th, Shanghai, Sep. 21-23, 2005 [CIT 2005 Proceedings], pp. 322-326.

* cited by examiner

*Primary Examiner* — Duc T Doan
(74) *Attorney, Agent, or Firm* — Michael J. Buchenhorner; Derek S. Jennings

(57) ABSTRACT

A computer-implemented method of cache replacement includes steps of: determining whether each cache block in a cache memory is a read or a write block; augmenting metadata associated with each cache block with an indicator of the type of access; receiving an access request resulting in a cache miss, the cache miss indicating that a cache block will need to be replaced; examining the indicator in the metadata of each cache block for determining a probability that said cache block will be replaced; and selecting for replacement the cache block with the highest probability of replacement.

17 Claims, 7 Drawing Sheets

PREFERRED WRITE-MOSTLY DATA CACHE REPLACEMENT POLICIES

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of cache memories and more particularly relates to the field of cache replacement.

BACKGROUND OF THE INVENTION

Computer systems employ cache memories because their access latency is significantly less than the access latency of main memory. These cache memories retain recently accessed data, in the hope that this data will be accessed again in the future. Memory operations performed by the processor access this cache memory first; in the event that the accessed data is not in the cache (termed a cache miss), the processor must wait for an extended period of time while that data is loaded into the cache from a more remote memory. Processor stalls caused by this wait period can account for the majority of execution time for many applications. Consequently, reducing the frequency of these cache misses can result in significant performance improvement.

Cache memories are logically organized as multiple sets of cache blocks. When a cache miss occurs, the set in which the new block is placed is first determined. If that set is full, room must be created for the new block by evicting one of the currently residing blocks from the set. This block is termed the victim. There has been much prior work described in the literature on determining the best choice of victim, such that the cache miss rate will be minimized. Examples of such cache block replacement policies include least-recently used (LRU) and first-in-first out (FIFO). These replacement policies have been designed to minimize the frequency of misses to the cache, regardless of whether those misses were caused by load or store instructions.

Computer systems sometimes employ write buffers to temporarily buffer data written by a processor, so that in the event of a cache miss to the memory referenced by a store instruction, the processor may continue to execute instructions without stalling until the cache miss completes. Unlike store misses, a processor must wait on load misses to complete, because subsequent instructions that are dependent upon the data returned by the cache miss cannot execute until the data is available. Consequently, the performance cost of a load miss is generally larger than the performance cost of a store miss.

Existing cache block replacement methods do not account for this discrepancy between miss cost, resulting in replacement policies that minimize all misses, regardless of whether those misses are loads or stores. Replacement policies that minimize load misses (at the expense of increased store misses) may increase overall performance, given sufficient store buffering resources.

Therefore, there is a need for a cache block replacement method to overcome the stated shortcomings of the prior art.

SUMMARY OF THE INVENTION

Briefly, according to an embodiment of the invention a cache replacement method includes steps or acts of: determining, for each cache block brought into cache memory, what type of access request prompted the addition; and augmenting metadata associated with each cache block with an indicator of the type of access request. Upon receiving an access request resulting in a cache miss, the cache miss indicating that a cache block needs to be replaced, examining the indicator in the metadata of each cache block for determining a probability that said cache block will be replaced; and selecting for replacement the cache block with a highest probability for replacement. Augmenting the metadata may include setting a bit in the metadata.

Further, determining the probability of replacement may involve checking the indicator and, if the indicator identifies the cache block as being a write block, determining that the cache block is likely to be used again as a write block; and setting a high probability of replacement for that cache block. Alternatively, determining the probability of replacement may include checking the indicator and, if the indicator identifies the cache block as a read block, determining that it is likely to be used again as a write block, and setting a high probability of replacement for said cache block.

According to another embodiment of the present invention, a cache replacement method includes steps or acts of: associating a saturating counter with each cache block in cache memory; initializing the saturating counter to zero; and incrementing the saturating counter by one for each write access to the cache block. Upon receiving an access request resulting in a cache miss, comparing the saturating counter to a threshold value; and selecting the cache block for replacement that has the associated saturating counter greater than the threshold value.

According to an embodiment of the present invention, a cache replacement system includes: a cache memory which includes cache blocks wherein each cache block includes metadata, the metadata including an indicator of the type of access request that brought the cache block into cache memory; and a cache controller. The system further includes a cache algorithm for determining the probability of eviction.

BRIEF DESCRIPTION OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method for a data cache management process that classifies cache blocks according to the probability that a subsequent reference to that cache block is due to a read or a write. The classification of the cache block determines whether it will be replaced. Furthermore, the method provides a hybrid policy that, when in effect, establishes an algorithm that predicts the future accessing of write-mostly blocks for evicting the least recently write-accessed block when memory space is needed; else it performs according to conventional LRU cache behavior, evicting the least recently touched (due to either a read or write) write type data block.

In a conventional set-associative cache utilizing an LRU replacement algorithm, a victim is selected from among several candidates based purely on the aging of accessing each of the blocks; the block least recently touched is chosen for eviction. In contrast, the cache replacement algorithm as described herein selectively designates a block for replacement based on the likelihood that a subsequent access to that block will be a read or a write request. We will describe several implementation mechanisms that may be used to predict this likelihood for a certain victim.

Figure 1:
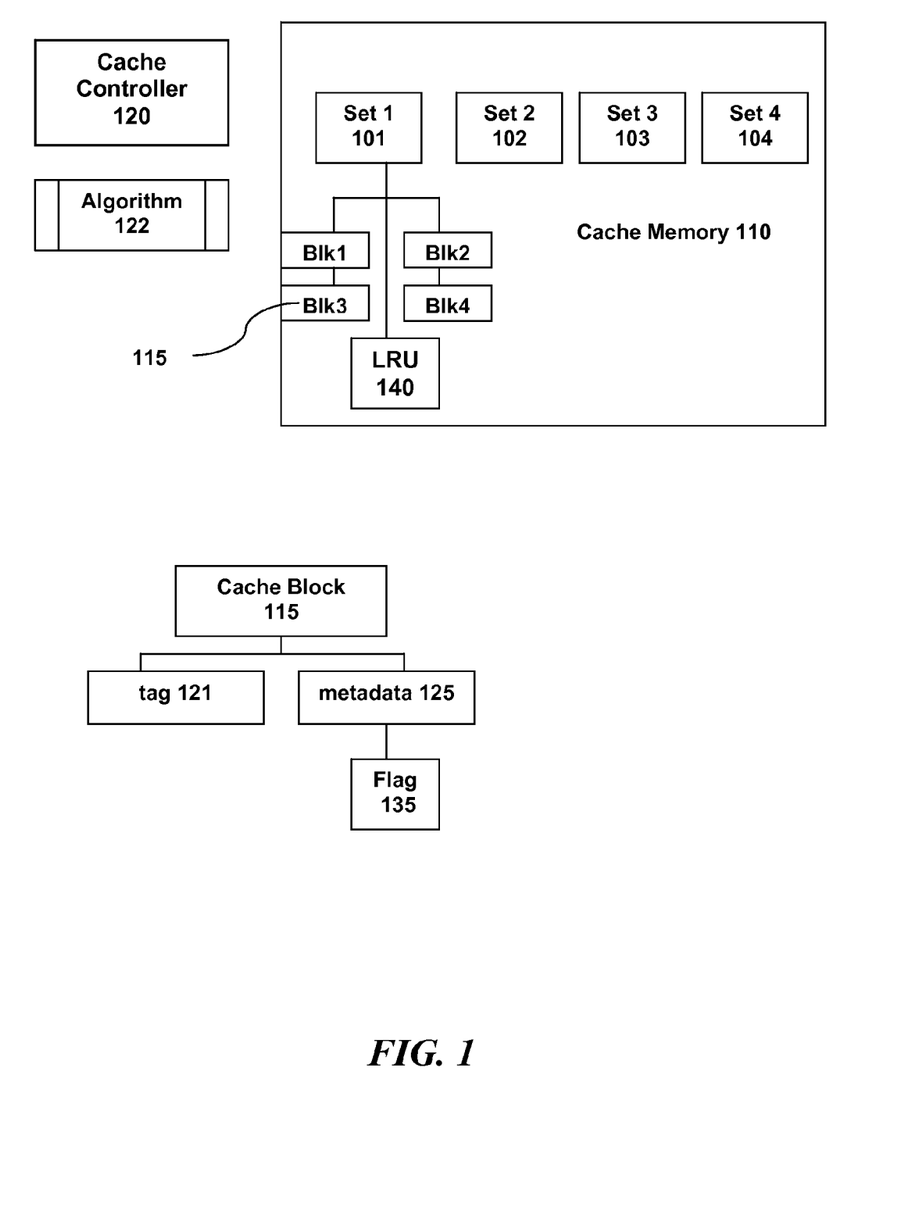
FIG. 1 is a simplified illustration of a system configured to operate according to an embodiment of the present invention.

Referring now in specific detail to the drawings, and particularly FIG. 1, there is illustrated a cache management system 100 configured to operate according to an embodiment of the present invention. Cache memory 110 in this example is a set-associative cache encompassing four sets of data blocks 115 each. Each set 101, 102, 103, and 104, has four data blocks 115 (Blk1, Blk2, Blk3, and Blk4). The number of sets and cache blocks within cache memory may vary by system. Each cache block 115 has a tag 121 identifier and metadata 125. The metadata 125 in a cache block may contain cache properties data such as coherence permissions, and an LRU bit.

A cache controller 120 handles access requests to the cache memory 110 A least recently used (LRU) stack 140 is associated with each set (101-104) in the cache 110. The LRU stack 140 contains a register of the blocks within the set, ordered by temporal history. Conventionally, the most recently used blocks are at the "top" of the stack 140 and the least recently used blocks are referenced at the "bottom" of the stack 140. An algorithm 122 for selecting a block 115 for replacement is executed by the cache controller 120.

Figure 2:
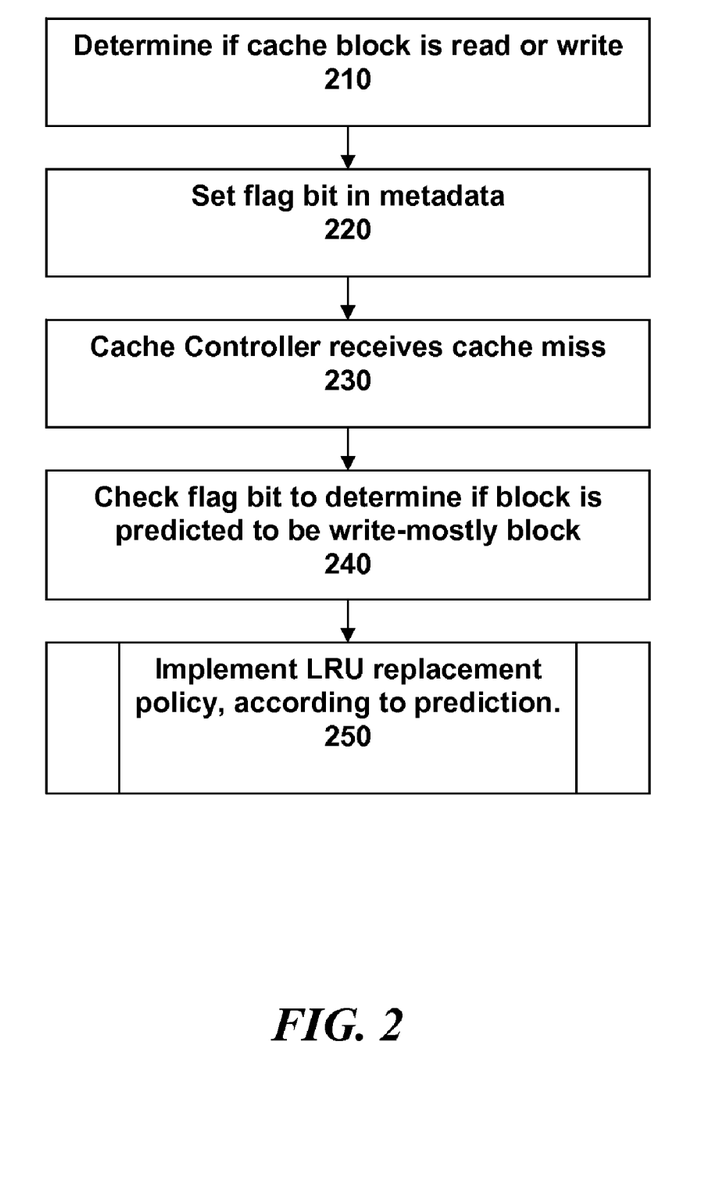
FIG. 2 is a flow chart of a method for selecting a victim, according to an embodiment of the present invention.

Referring to FIG. 2 there is shown a flow chart of an implementation of a method for selecting a victim, according to an embodiment of the present invention. In contrast to the conventional set-associative cache replacement algorithm, a preferred write-mostly cache replacement algorithm 122 instead selects a victim block that has been predicted to be a "write-mostly" block.

In the preferred embodiment, this prediction is based on whether or not the block 115 was brought into the cache 110 due to a read or a write. When the block 115 is first brought into the cache 110, in step 210 the cache controller 120 classifies the block 115 as a read or a write block. Next, in step 220 the metadata 125 for each block 115, such as: valid bits, coherence permission, and error-correcting codes (ECC) is augmented with an indicator 135 indicating whether or not the block 115 was brought into the cache 110 due to a read or a write. This determination is important because a write block is likely to be accessed as a write block again. The indicator 135 may be a single bit (flag bit) set to one for a write and zero for a read.

In step 230, the cache controller 120 receives notification that an access request for a block 115 resulted in a cache miss. It must evict a cache block 115; therefore it begins the process of selecting a cache block 115 slated for replacement (victims). When selecting a victim, in step 240 the cache controller 120 examines the metadata 125 in each block 115 and checks the indicator 135 (previously set in step 220) in order to determine whether or not the block 115 is predicted to be a "write-mostly block." If the indicator 135 indicates that the block 115 was brought in for a write; that block 115 is predicted to be a write-mostly block. In step 250, the result of this prediction is integrated with an existing LRU cache replacement policy as shown in the flow chart of FIG. 3.

Figure 3:
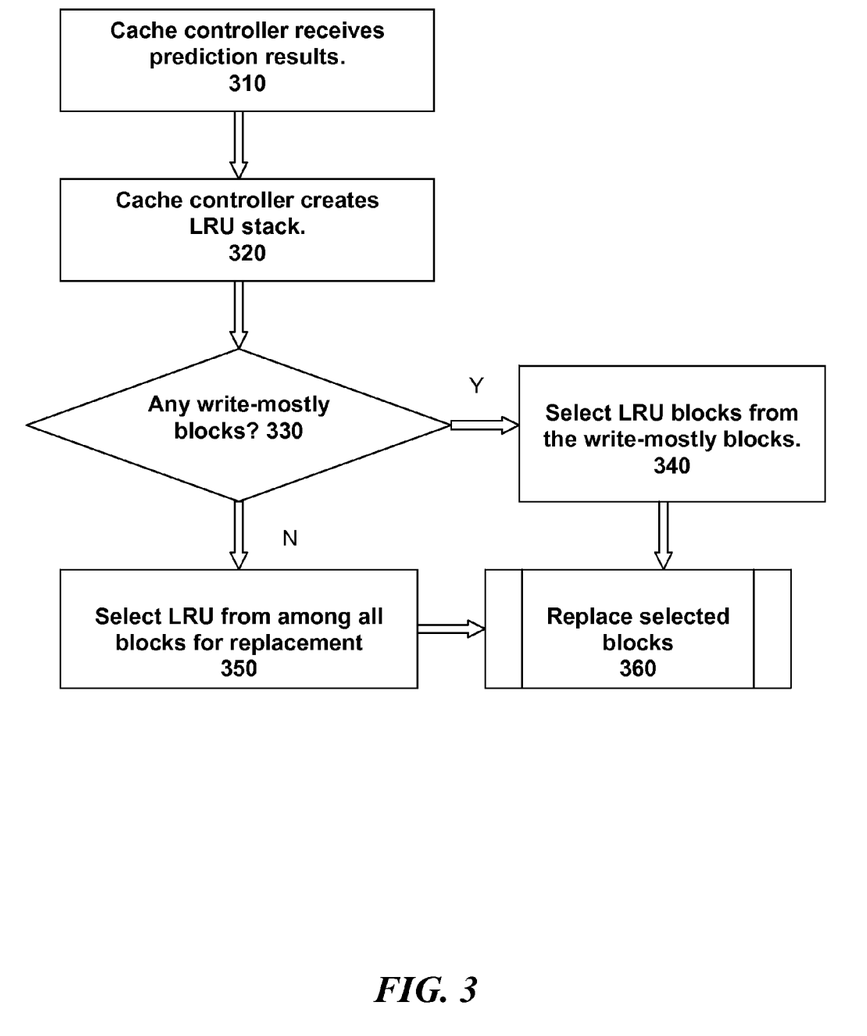
FIG. 3 is a flow chart of the write-mostly replacement algorithm, according to an embodiment of the present invention.

Referring to FIG. 3, in step 310 the cache controller 120 receives the prediction results of one or more write-mostly blocks. In step 320 the cache controller 120 interrogates the LRU stack 140 from each cache set (101-104) and the indicator bit 135 for each block 115 in order to select the victim. Next, in step 330 the cache controller 120 determines if there are any write-mostly blocks within an LRU stack 140. If there are any write-mostly blocks, in step 340 the replacement algorithm 122 selects for replacement any of the predicted write-mostly blocks 115. Alternatively, the controller 120 may select for eviction only those write-mostly blocks that fall within the bottom half of the LRU stack 140.

In step 350, given a prediction of no write-mostly blocks 115 in the LRU stack 140, the replacement algorithm 122 behaves as usual; the least recently touched cache block 115 is replaced. Lastly, in step 360, the selected blocks are replaced according to known procedures. The relative performance of the different prediction mechanisms is workload dependent, so each may be useful for certain memory reference patterns.

Once this prediction has been made, the cache controller 120 can use this information to preferentially evict the write-mostly block 115 earlier than it would otherwise be evicted. Because conventional LRU-based caches record information that temporally orders the blocks 115 with respect to one another in terms of their aging of access, the write-mostly prediction can be used to evict any write-mostly block 115, no matter where it resides in this temporal order, or it may be used to evict a write-mostly block 115 only after the block 115 has reached a certain position within this order. Depending on the application, one or the other of these choices may exhibit better performance.

A preferred-write-mostly cache replacement algorithm 122 may also be used in caches 110 that utilize other cache replacement algorithms (e.g. random, FIFO, etc). Such an implementation would work similarly to the integration with the LRU implementation as described above.

In another embodiment, in caches 110 with a large number of blocks 115 per set (and hence a large number of replacement candidates), a hybrid policy may also be used, which sometimes prefers replacing a write-mostly block, but prefers the least recently used block if the write-mostly block was recently touched.

We describe three different embodiments for a mostly write-access block prediction mechanism.

Figure 4:
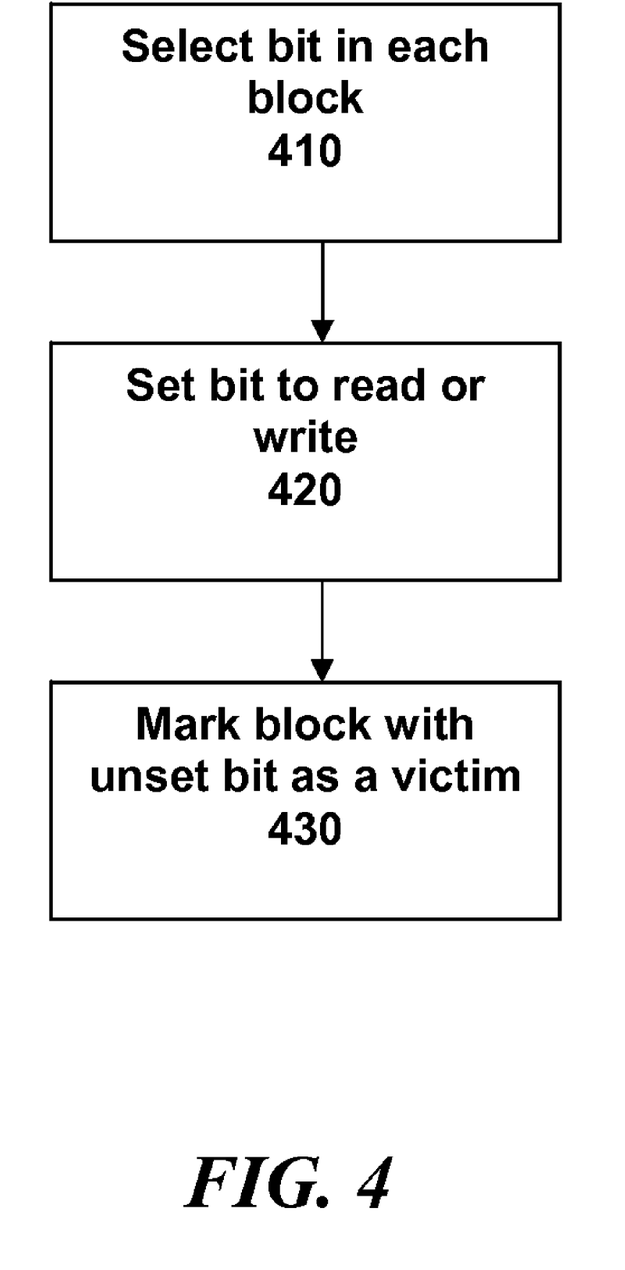
FIG. 4 is a flow chart of the ever-been-read replacement method, according to an embodiment of the present invention.

Referring to FIG. 4 there is shown a flow chart for the per-block "ever-been-read" bits method embodiment. This prediction mechanism simply assumes a cache-resident block 115 that has not yet been read will not be read prior to replacement. In step 410, for each cache block 115, a single bit is maintained indicating whether or not that block 115 has been read. This it can be maintained in the metadata 125. In step 420, the bit is set to 0 when the block 115 is brought into the cache 110 due to a write, and is set to 1 if the block 115 is ever read.

In step 430, the cache replacement algorithm 122 will subsequently assume that any cache block 115 with this bit unset is most likely to be unread in the future; therefore that block 115 is likely to be marked as a victim. Such an algorithm 122 is applicable only to write-allocate caches; in caches that do not allocate blocks on writes, read bits would always be set.

Figure 5:
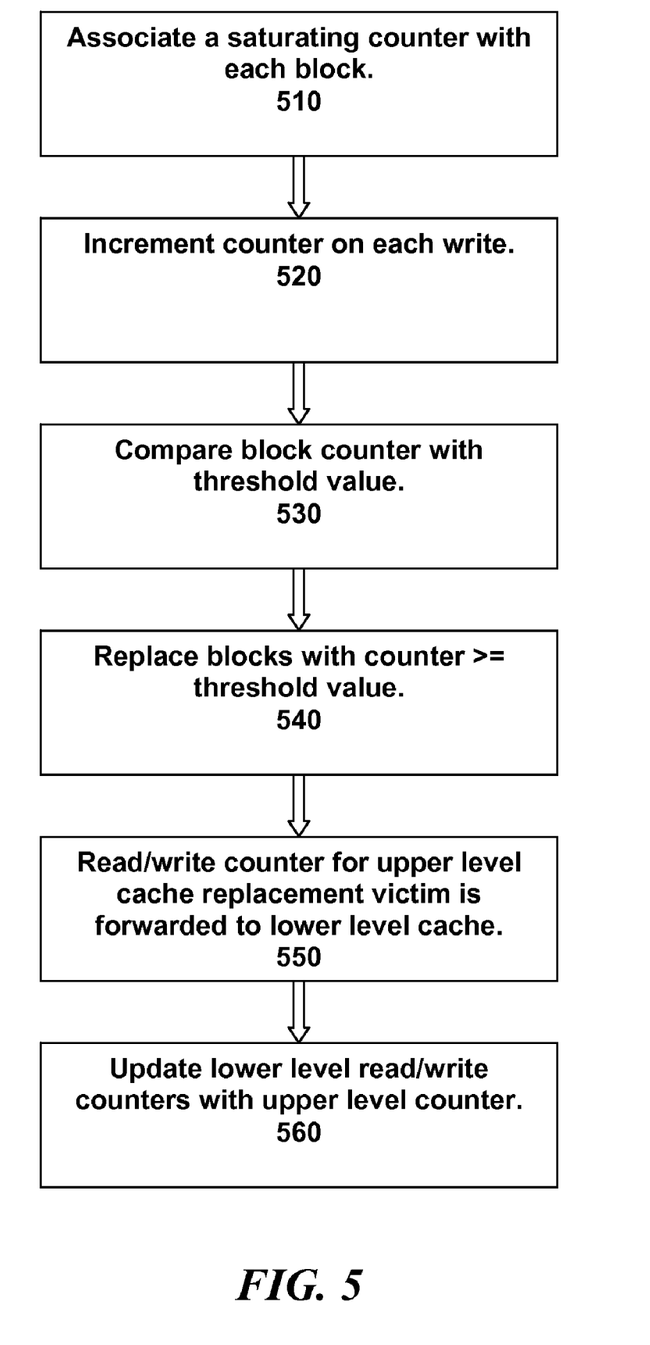
FIG. 5 is a flow chart of the read/write counters replacement method, according to an embodiment of the present invention.

Referring to FIG. 5, there is shown a flow chart for the per block "read/write counters" method embodiment. In addition to write-only blocks, it may be advantageous to select for replacement write-mostly blocks. Some cache blocks may be occasionally read (therefore usually setting a per-block read bit), but written in the common case. If replaced, such blocks would most likely be reloaded on a subsequent write.

To detect such cases one could use the following mechanism: in step 510 a signed saturating counter is associated with each cache block 115. The counter may be set in the metadata 125. The counter is initialized to zero. In step 520 this counter is incremented by one on each write (such a counter could be updated with ECC mechanisms, which already require a read/modify/write per store operation), and decremented on each read. On a replacement, in step 530, the associated counter is compared to a certain threshold value to determine the write-mostly prediction used by the replacement algorithm. In step 540, a replacement algorithm replaces a block associated with a counter greater than or equal to the threshold value. A counter greater than or equal to a threshold value indicates that that the cache block is a "write-mostly" block. Write-mostly blocks using this method are weighted more heavily when selecting victims. A threshold greater than zero indicates that there are more writes than reads for that block 115. A threshold of two indicates that there are approximately more than twice as many writes as there are reads (it is approximate because when the counter saturates, some counts may be lost). The optimal threshold may vary between workloads, but chances are that a value of two, three, or four would work pretty well. The value may also be hard-coded into the count.

In the case of lower-level caches whose reference stream is filtered by an upper level cache, per-block read/write counters are maintained at both the upper and lower level caches. Upper level victims are chosen as described above; however, upon replacement, the read/write counter for the victim is forwarded to the lower-level cache in step 550. This counter is then used to update the lower level's read/write counters in step 560. This update is performed because an L2 cache is only referenced when there is an L1 miss; therefore there is no way for an L2 cache to construct this read/write ratio, because most of the accesses to the block are being filtered by the L1 cache. Consequently, the L1 needs to communicate the ratio to the L2.

Figure 6:
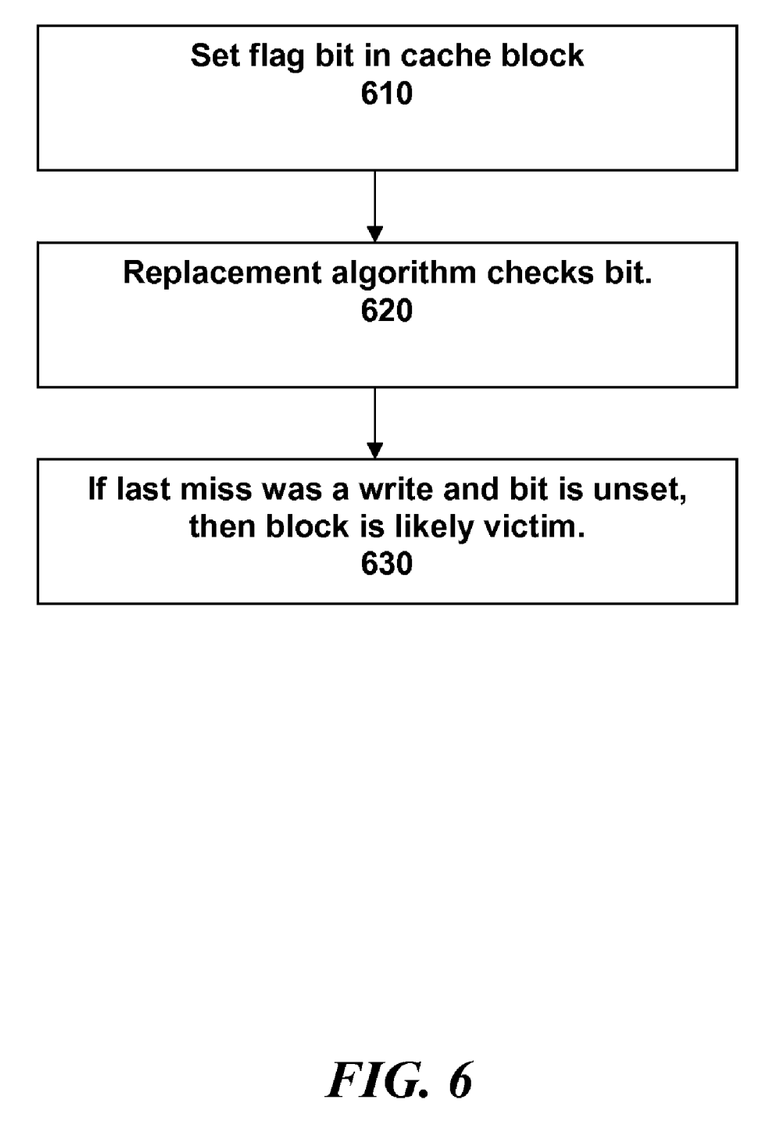
FIG. 6 is a flow chart of the miss type bits replacement method, according to an embodiment of the present invention.

Referring to FIG. 6 there is shown a flow chart of the per block "miss type bits" method. This prediction mechanism associates a single bit with each cache block. The bit is set to 1 if the block was brought into the cache by a load or instruction fetch, set to 0 if the block was brought into the cache due to a write in step 610. If the last miss to the cache block was caused by a write, then it is likely that the next cache miss will also be a write. Therefore, after checking the bit in step 620, if the bit is unset (zero), the replacement algorithm in step 630 will weight this block more heavily because it is likely that the subsequent miss to the block will also be a write.

Figure 7:
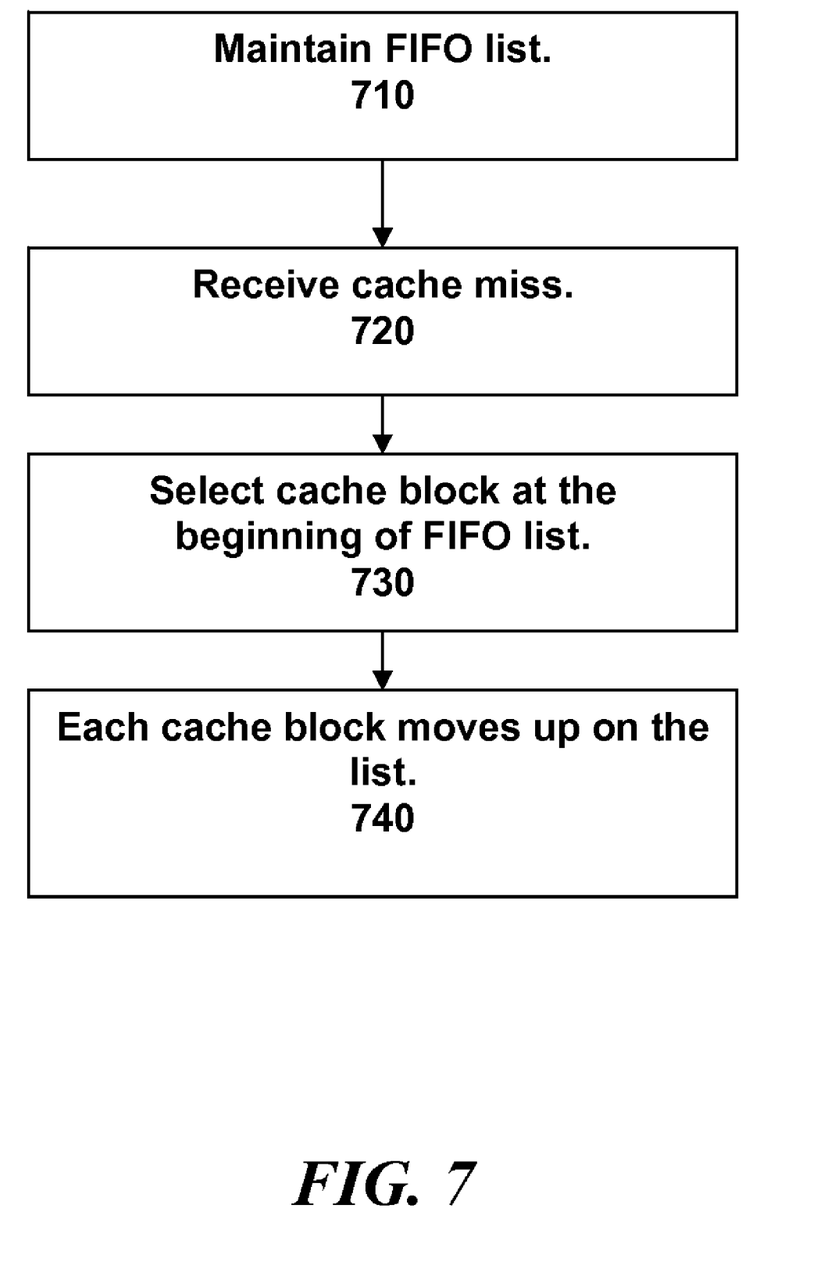
FIG. 7 is a flow chart of a FIFO replacement method, according to an embodiment of the present invention.

Referring to FIG. 7 there is shown a flow chart of an alternate FIFO embodiment. In step 710, a FIFO list is maintained, wherein the cache controller 120 places each cache block on the list, as the block is accessed. The first blocks accessed are at the beginning of the list. When the cache controller 120 receives a cache miss in step 720, it selects the cache block at the beginning of the list in step 730. This cache block is the victim. Integration of the preferred write-mostly cache replacement method with a FIFO cache algorithm will be obvious to those with knowledge in the art, based on the preceding description of integration with an LRU policy.

The invention claimed is:

1. A computer-implemented method of cache replacement, the method comprising steps of:
   determining, for each cache block in a cache memory, a type of access that brought the cache block into the cache memory;
   augmenting metadata associated with each cache block with an indicator of type of access request;
   upon receiving an access request resulting in a cache miss, the cache miss indicating that a cache block needs to be replaced, examining the indicator in the metadata of each cache block for determining a probability that the cache block will be replaced;
   wherein determining the probability comprises:
     checking the indicator;
     if the indicator identifies the cache block as a read block, determining that the cache block is likely to be used again as a write block; and
     setting a high probability of replacement for the cache block; and
   selecting for replacement one of the cache blocks with a highest probability for replacement among the cache blocks.

2. The computer-implemented method of claim 1 wherein augmenting the metadata comprises setting a bit in the metadata as the indicator.

3. The computer-implemented method of claim 1 wherein determining the probability comprises:
   checking the indicator;
   if the indicator identifies the cache block as being a write block, determining that the cache block is likely to be used again as a write block; and
   setting a high probability of replacement for the cache block.

4. The computer-implemented method of claim 1 wherein the selecting element further comprises determining whether a last miss to the cache block was due to a write access.

5. The computer-implemented method of claim 1 further comprising examining a least recently used stack for determining the probability that the cache block will be replaced, the least recently used stack comprising a temporally-ordered list of cache block access.

6. The computer-implemented method of claim 5 further comprising:
   determining that the cache block in the least recently used stack has the highest probability of replacement.

7. The computer-implemented method of claim 6 further comprising allocating the highest probability of replacement to the cache block in a top percentile of the least recently used stack.

8. The computer-implemented method of claim 1 wherein determining the probability comprises determining whether the cache block was ever read while in the cache memory.

9. The computer-implemented method of claim 1 wherein determining the probability comprises determining a ratio of read accesses to write accesses to the cache block while in the cache memory.

10. The computer-implemented method of claim 1 further comprising basing the probability on access types other than read and write access requests.

11. The computer-implemented method of claim 10 wherein the probability is based on instruction fetches.

12. A system for cache replacement comprising:
   a cache memory comprising cache blocks wherein each cache block comprises metadata, the metadata comprising an indicator of a type of access request that brought the cache block into cache memory;
   a cache controller configured for:
      determining, for each cache block brought into the cache memory, the type of access request that brought the cache block into the cache memory;
      setting an indicator in the metadata for each cache block, the indicator indicating the type of access request;
      receiving access requests and retrieving cache blocks to satisfy the access requests; and
      evicting cache blocks according to a determined probability of eviction; and
   a cache algorithm for determining the probability of eviction; and
   a least recently used stack comprising a temporally ordered listing of cache block access;
   wherein determining which cache block to evict comprises:
      checking the least recently used stack associated with each block;
      for every block determined to be least recently used:
         checking the indicator in the metadata; and
         if the indicator identifies the cache block as being a read block,
            determining that the cache block is likely to be used again as a write block;
      setting a high probability of replacement for the cache block; and
      selecting for replacement one of the cache blocks with a highest probability for replacement among the cache blocks.

13. The system of claim 12 wherein determining which cache block to evict comprises:
   checking the indicator in the metadata; and
   if the indicator identifies the cache block as being a write block, determining that the cache block is likely to be used again as a write block; and
   setting a high probability of replacement for the cache block.

14. The system of claim 12 wherein determining which cache block to evict comprises:
   checking the least recently used stack associated with each block;
   for every block determined to be least recently used:
      checking the indicator in the metadata;
      if the indicator identifies the cache block as being a write block, determining that the cache block is likely to be used again as a write block; and
      setting a high probability of replacement for the cache block.

15. The system of claim 12 wherein determining which cache block to evict comprises:
   checking the least recently used stack associated with each block;
   for every block determined to be least recently used:
   checking the indicator in the metadata; and
   if the indicator identifies the cache block as being a read block setting a high probability of replacement for the cache block.

16. A computer program product tangibly embodied on a non-transitory computer readable medium and comprising code that, when executed, causes a computer to:
   determine, for each cache block in a cache memory, a type of access that brought a cache block into the cache memory;
   augment metadata associated with each cache block with an indicator of type of access request;
   upon receipt of an access request resulting in a cache miss, examining the indicator in the metadata of each cache block to determine a probability that the cache block will be replaced;
   wherein determining the probability comprises:
      checking the indicator;
      if the indicator identifies the cache block as a read block, determining that the cache block is likely to be used again as a write block; and
   setting a high probability of replacement for the cache block; and
   selecting for replacement one of the cache blocks with a highest probability for replacement.

17. A computer-implemented method of cache replacement, the method comprising steps of:
   determining, for each cache block in a cache memory, a type of access that brought the cache block into the cache memory;
   augmenting metadata associated with each cache block with an indicator of type of access request;
   upon receiving an access request resulting in a cache miss, the cache miss indicating that a cache block needs to be replaced:
      checking a least recently used stack comprising a temporally ordered listing of cache block access;
      examining the indicator in the metadata for each cache block determined to be least recently used; and
      if the indicator identifies the cache block as being a read block, determining that the cache block is likely to be used again as a write block; and setting a high probability of replacement for the cache block; and
   selecting for replacement one of the cache blocks with a highest probability for replacement.

* * * * *